US010331827B1

(12) United States Patent
Shimanouchi et al.

(10) Patent No.: US 10,331,827 B1
(45) Date of Patent: Jun. 25, 2019

(54) METHOD AND APPARATUS FOR PROCESSING DATA AND PERFORMING CROSSTALK SIMULATION

(71) Applicant: Altera Corporation, San Jose, CA (US)

(72) Inventors: Masashi Shimanouchi, San Jose, CA (US); Peng Li, Palo Alto, CA (US); Hsinho Wu, Santa Clara, CA (US)

(73) Assignee: Altera Corporation, San Jose, CA (US)

( * ) Notice: Subject to any disclaimer, the term of this patent is extended or adjusted under 35 U.S.C. 154(b) by 1542 days.

(21) Appl. No.: 13/929,536

(22) Filed: Jun. 27, 2013

(51) Int. Cl.
G06F 17/50 (2006.01)
H04B 1/00 (2006.01)
H04B 3/00 (2006.01)

(52) U.S. Cl.
CPC ........... G06F 17/5036 (2013.01); H04B 1/00 (2013.01); H04B 3/00 (2013.01)

(58) Field of Classification Search
USPC ......... 703/2, 18, 19; 368/117; 370/252, 503; 713/503; 375/343
See application file for complete search history.

(56) References Cited

U.S. PATENT DOCUMENTS

| 6,184,702 | B1* | 2/2001 | Takahashi | ........... H01L 23/5222 257/659 |
| 7,995,619 | B2* | 8/2011 | Ja | ........................ G06F 13/4291 368/117 |
| 9,237,044 | B1* | 1/2016 | Wu | .................... H04L 25/03019 |
| 9,251,300 | B2* | 2/2016 | Hutton | ................... G06F 17/505 |
| 10,075,204 | B2* | 9/2018 | Bogdan | ................. H04B 1/1027 |
| 2001/0044709 | A1* | 11/2001 | Fujimori | .............. G06F 17/5036 703/2 |
| 2003/0016770 | A1* | 1/2003 | Trans | ........................ H04B 1/00 375/346 |
| 2003/0086515 | A1* | 5/2003 | Trans | ........................ H04B 1/00 375/346 |
| 2006/0215792 | A1* | 9/2006 | Murugan | .................. H04B 3/32 375/343 |
| 2007/0098020 | A1* | 5/2007 | Ja | ......................... G06F 13/4291 370/503 |
| 2007/0171733 | A1* | 7/2007 | Wood | ................... G06F 17/5036 365/210.1 |
| 2007/0275607 | A1* | 11/2007 | Kwark | ................. H05K 1/0216 439/676 |
| 2008/0192645 | A1* | 8/2008 | Ja | ......................... G06F 13/4291 370/252 |
| 2011/0031627 | A1* | 2/2011 | Cabrera | .............. G06F 17/5077 257/773 |
| 2014/0201561 | A1* | 7/2014 | Restle | ....................... G06F 1/10 713/503 |

* cited by examiner

Primary Examiner — Thai Q Phan

(74) Attorney, Agent, or Firm — Compass IP Law PC

(57) ABSTRACT

A method for performing simulation includes determining whether a model is available for a channel. A model for the channel is generated using signal attenuation parameters provided by a user in response to determining that the model is unavailable. The model includes crosstalk characteristics from crosstalk parameters provided by the user.

22 Claims, 11 Drawing Sheets

METHOD AND APPARATUS FOR PROCESSING DATA AND PERFORMING CROSSTALK SIMULATION

FIELD

Embodiments of the present invention relate to tools used for channel simulation. More specifically, embodiments of the present invention relate to a method and apparatus for processing data for simulating the effects of crosstalk on channels.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are synthesis, placement, and routing of the system on the target device.

As technology progresses, the demand for higher data rate for communication components implemented on the target devices have increased to support video imaging, wireless communication, data storage, and other applications. With high-speed input/output (I/O) interface data rates doubling every few years, it has become necessary to accurately model transmitters, receivers, and interconnects between the transceivers and receivers on target devices to predict the quality of performance of high speed serial channels. Simulation tools offer designers the ability to model the characteristic of channels and evaluate their performance. Both transistor-level simulation methods and behavior-level simulation methods have been used.

When modeling the transmitters, receivers, and interconnects, it is important to take into account of any crosstalk which may adversely impact the integrity of the signals transmitted. In electronics, crosstalk is the phenomenon by which a signal transmitted on one circuit or channel of a transmission system creates an undesired effect in another circuit or channel. Crosstalk is usually caused by undesired capacitive, inductive, or conductive coupling from one circuit, part of a circuit, or channel, to another.

SUMMARY

A method and apparatus for processing data and performing crosstalk simulation is disclosed. When insufficient crosstalk information is available from a system design for simulation, crosstalk parameters provided by a user are utilized to generate crosstalk characteristics that are injected into a model of a channel under analysis. When a simulator's capabilities are limited to simulating a single channel model at a time, a channel model that describes crosstalk characteristics is combined with a channel model that describes the channel under analysis to form a single combined channel model that may be simulated by the simulator to determine the effects of crosstalk on the channel under analysis.

According to a first embodiment of the present invention, it is determined whether a model is available for a channel. In response to determining that the model is unavailable, a model is generated for the channel using signal attenuation parameters provided by a user. The model is generated to also include crosstalk characteristics from crosstalk parameters provided by the user. According to a second embodiment of the present invention, a first model for a first channel is combined with a second model for second channel having crosstalk into a single combined model. The single combined model is simulated.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
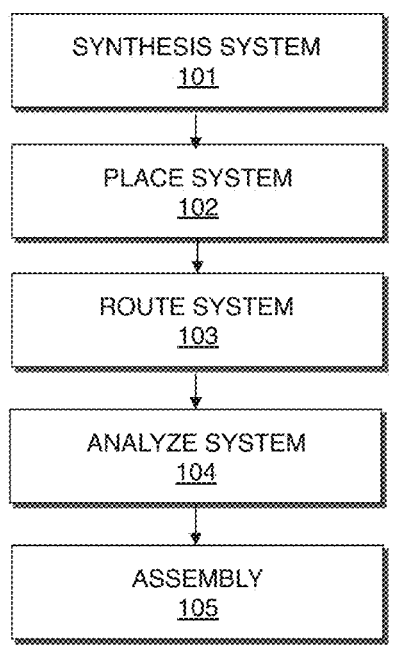
FIG. 1 is a flow chart illustrating a method for designing a system on a target device according to an exemplary embodiment of the present invention.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, the system is synthesized. Synthesis includes generating a logic design of the system to be implemented by the target device. According to an embodiment of the present invention, synthesis generates an optimized logical representation of the system from a hardware description language (HDL) design definition. Synthesis also includes mapping the optimized logic design. According to an embodiment of the present invention, a netlist is generated from mapping. This netlist may be an optimized technology-mapped netlist generated from the HDL.

At 102, the system is placed. According to an embodiment of the present invention, placement involves placing the mapped logical system design on the target device. Placement works on the technology-mapped netlist to produce a placement for each of the functional blocks. According to an embodiment of the present invention, placement includes fitting the system on the target device by determining which resources on the logic design are to be used for specific logic elements, and other function blocks determined to implement the system as determined during synthesis. Placement may include clustering which involves grouping logic elements together to form the logic clusters present on the target device.

At 103, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 104, the system design is analyzed. According to an embodiment of the present invention, various aspects of the system design may be analyzed. The analysis may include a timing analysis of signals routed on routing paths which may also be referred to as links or channels. The analysis may also include a simulation of aspects of the system design to determine the effect of crosstalk on signals transmitted on the channels in the system. According to an embodiment of the present invention, in response to the results obtained from the analysis, one or more of the procedures 101-103 may be performed again to modify and improve the system design.

At 105, an assembly procedure is performed. The assembly procedure involves creating a data file that includes information determined by the procedures described at 101-104. The data file may be a bit stream that may be used to program a target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system, which may be used to program the target device according to the system design. It should be appreciated that the design of the system may also be output in other forms such as on a display device or other medium. The target device may be programmed with the data file. By programming the target with the data file, components on the target device are physically transformed to implement the system.

Figure 2:
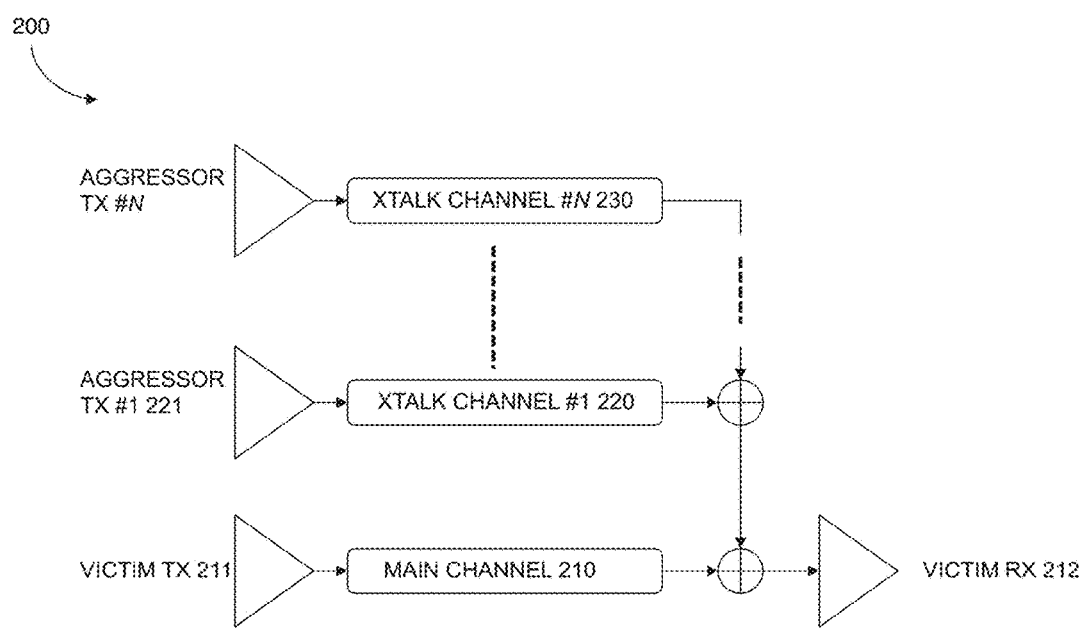
FIG. 2 illustrates an exemplary model of the relationship between crosstalk and a channel under analysis.

FIG. 2 illustrates an exemplary model 200 of the relationship between a channel under analysis and crosstalk. In the model 200, main channel 210 represents a channel under analysis. The main channel 210 includes routing resources which connect a victim transceiver (TX) 211 to a victim receiver (RX) 212. The model 200 includes a first crosstalk (XTALK) channel 220 and an Nth crosstalk channel 230 which are connected to aggressor transceivers 221 and 231 respectively. The first crosstalk channel 220 through the Nth cross talk channel 230 represent routing resources which transmit signals that generate a crosstalk effect on main channel 210. Crosstalk is the effect on a channel caused by cross-coupling with a neighboring channel. The channel that is being analyzed may be referred to as the victim, while the trace that is cross-coupled with the victim channel may be referred to as the aggressor. Crosstalk is dependent upon an edge rate of a signal on the aggressor channel. A faster edge induces more crosstalk. When an operating frequency of a transmitter is increased, the transmitter usually increases its edge rate to improve the signal noise margin. Crosstalk can be a major contributor to an amount of jitter present in a device. Jitter is the deviation of an edge from its expected location. A large amount of jitter in a serial communication channel may cause bit errors in the received serial bit stream. According to an embodiment of the present invention, the analysis performed at 104 (shown in FIG. 1) evaluates the impact of crosstalk on victim channels in the system design by performing simulations with models of the victim and one or more aggressor channels.

Figure 3:
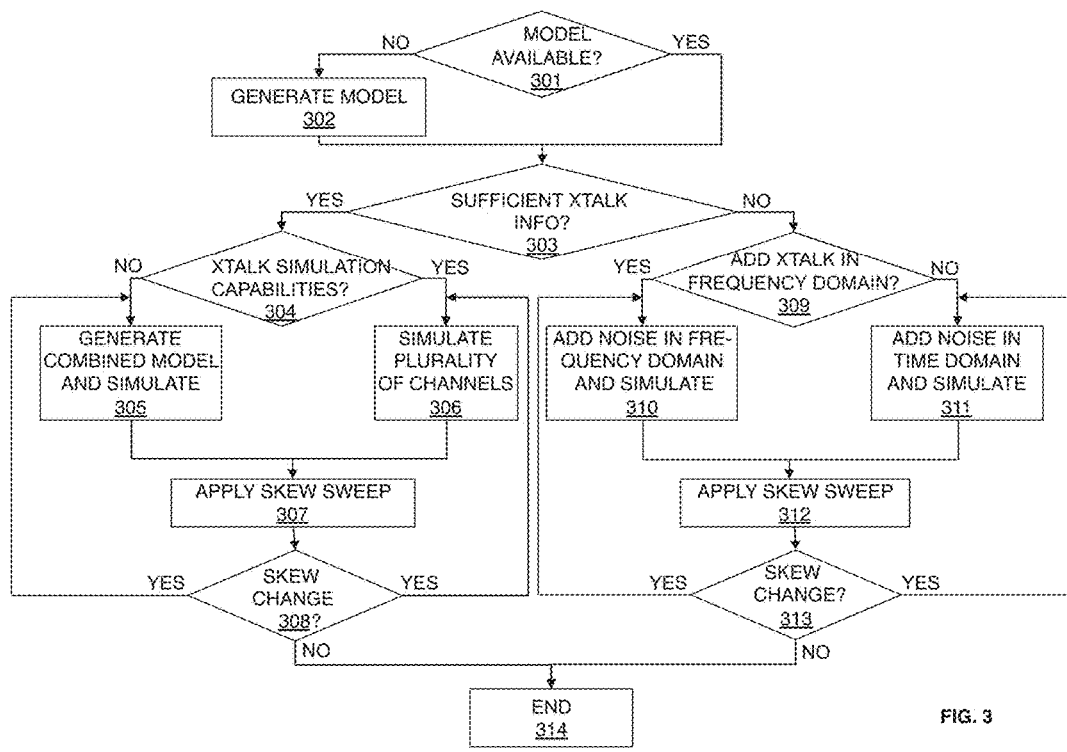
FIG. 3 is a flow chart illustrating a method for performing channel simulation according to an exemplary embodiment of the present invention.

FIG. 3 is a flow chart illustrating a method for performing channel simulation according to an exemplary embodiment of the present invention. According to an embodiment of the present invention, the procedures illustrated in FIG. 3 may be used in part to implement procedure 104 illustrated in FIG. 1.

At 301, it is determined whether a model for a channel under analysis is available. According to an embodiment of the present invention, the model includes a description of characteristics of the channel. The model may be in the format of an impulse response, scattering parameters (s-parameters), or other format. If a model of the channel is not available, control proceeds to 302. If a model of the channel is available, control proceeds to 303.

At 302, a model is generated for the channel According to an embodiment of the present invention, the model is generated using signal attenuation and propagation delay parameters provided by a user to describe characteristics of the channel. The signal attenuation parameters may include parameters associated with direct current, Skin effect, dielectric loss, and/or other parameters. It should be appreciated that causality and passivity may be enforced in the model that is generated.

At 303, it is determined whether sufficient crosstalk information is available for an analysis. According to an embodiment of the present invention, a number of aggressor channels which may impact the channel under analysis (victim channel) are identified. If models are available for all of the identified aggressor channels or for a predetermined percentage of the aggressor channels, a determination is made that sufficient crosstalk information is available for analysis. It should be appreciated that other criteria may also be used to determine whether sufficient crosstalk information is available for analysis. If sufficient crosstalk information is available for the analysis, control proceeds to 304. If sufficient crosstalk information is not available for the analysis, control proceeds to 308.

At 304, it is determined whether a simulator being used is capable of simulating crosstalk. According to an embodiment of the present invention, simulators which have the ability to process more than one model at a time are capable of simulating crosstalk. If the simulator is not capable of simulating crosstalk, control proceeds to 305. If the simulator is capable of simulating crosstalk, control proceeds to 306.

At 305, a combined model is generated which includes the model for the channel under analysis and one or more aggressor channels that describe the characteristics of the crosstalk. The combined model is used by a simulator to simulate the effects of crosstalk on signals on the victim channel. The combined model allows a simulator which would normally not be able to simulate crosstalk, due to limitations on a number of models it could simulate at one time, to simulate the effects of crosstalk.

At 306, the model for the channel under analysis and the model for the aggressor channel are used for a simulation to determine the effect of crosstalk on signals transmitted on the channel under analysis.

At 307, a skew sweep is applied. The skew sweep modifies the existing programmed skew in order to allow additional simulation to further investigate the effects of crosstalk. According to an embodiment of the present invention, a skew sweep may be performed by performing a sweep with a start, step, and stop values. Alternatively, the skew sweep may be performed by first finding a gross phase skew for a target scenario using a single bit response. Afterwards, a finer skew may be used to find an optimum skew around the initial gross skew value.

At 308, it is determined whether there has been a change in the skew from the sweep. If a change has been made to the skew between a signal transmitted on the channel under analysis and the crosstalk characteristic, control returns to either originating procedure 305 or 306. If a change has not been made to the skew between a signal transmitted on the channel under analysis and the crosstalk characteristic, control terminates the procedure at 314.

At 309, it is determined whether crosstalk should be added in a frequency domain. According to an embodiment of the present invention, a user may specify whether crosstalk is to be added in a frequency domain or a time domain. If crosstalk is to be added in the frequency domain, control proceeds to 310. If crosstalk is not to be added in the frequency domain, control proceeds to 311.

At 310, crosstalk (noise) characteristics are added to the model of the channel under analysis in the frequency domain using crosstalk parameters provided by the user. According to an embodiment of the present invention, the crosstalk parameters are associated with insertion loss deviation to the channel under analysis. The crosstalk parameters may be provided by the user by designing a crosstalk frequency profile. In addition, skew may be added between a signal transmitted on the channel under analysis and the crosstalk characteristics. Simulation is performed using the model of the channel under analysis.

At 311, crosstalk characteristics is added to the model of the channel under analysis in the time domain. According to an embodiment of the present invention, crosstalk is added to the model of the channel under analysis using bounded uncorrelated noise. The bounded uncorrelated noise may be added using one or more different methods including a uniform, truncated Gaussian, dual-Dirac, or probability density function. It should be appreciated that either a waveform based simulation method or a statistical simulation method may be used to add crosstalk as bounded uncorrelated noise.

At 312, a skew sweep is applied. The skew sweep modifies the existing programmed skew in order to allow additional simulation to further investigate the effects of crosstalk. According to an embodiment of the present invention, a skew sweep may be performed by performing a sweep with a start, step, and stop values. Alternatively, the skew sweep may be performed by first finding a gross phase skew for a target scenario using a single bit response. Afterwards, a finer skew is used to find an optimum skew around the initial gross skew value.

At 313, it is determined whether there has been a change in the skew from the sweep. If a change has been made to the skew between a signal transmitted on the channel under analysis and the crosstalk characteristic, control returns to either originating procedure 310 or 311. If a change has not been made to the skew between a signal transmitted on the channel under analysis and the crosstalk characteristic, control terminates the procedure at 314.

According to an embodiment of the present invention, automatic skew control may be performed by dividing the procedures described with reference to FIG. 3 into two sections. The first section includes procedures related to processing victim and aggressor channels and other related parameters that are unrelated to the added/programmable skew. The second section includes procedures that take into account the skew that is added. In this embodiment, when skew is modified during the skew sweep 307/312 only the procedures in the second section need be re-executed. This procedure reduces the time required for facilitating simulation in comparison to using batch processing techniques.

Figure 4:
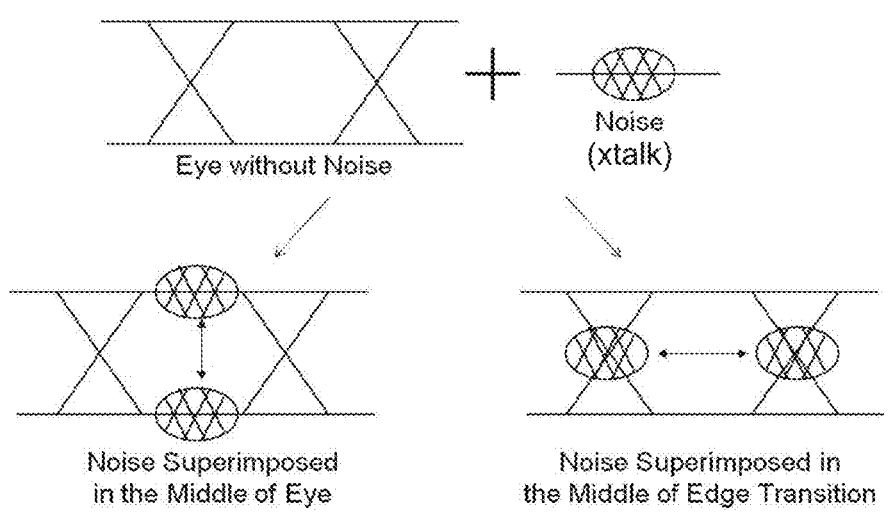
FIG. 4 illustrates examples of the effects of crosstalk on a signal.

By performing automatic skew control using the skew sweep, the effects of crosstalk on a signal may be investigated over a range of skews. This allows a designer to efficiently investigate various scenarios including best and worst case eye width, eye height, and other scenarios in between. FIG. 4 illustrates an example of the different effects of crosstalk (noise) on a signal with different programmable skew. As shown, the noise may be superimposed in the middle of an eye or superimposed in the middle of an edge transition, depending on the skew between the signal and noise. This allows a user to program a target device such that the impact of crosstalk is reduced by programming the skew such that the crosstalk noise is positioned at predetermined location in the eye diagram that provides the largest opening in the eye diagram. Embodiments of the invention allow a user to explore the effects of the crosstalk noise including both extremes illustrated in FIG. 4, and determine an optimal skew values to apply to minimize the effects of the crosstalk using simulation results.

Figure 5:
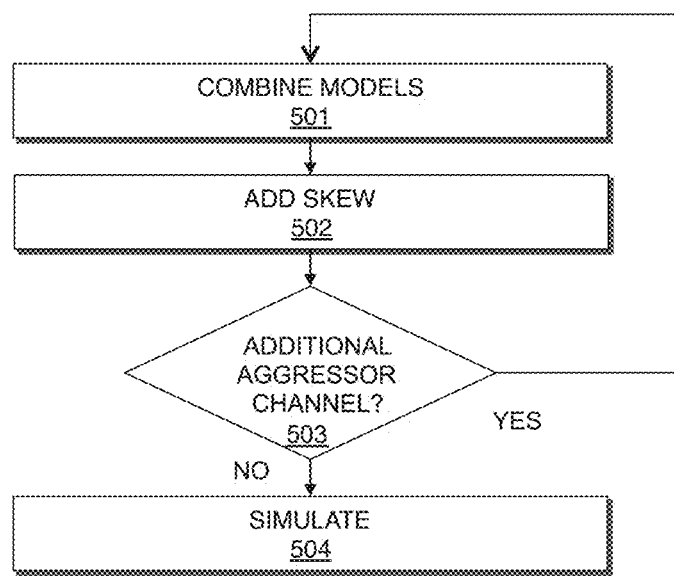
FIG. 5 is a flow chart illustrating a method for generating and utilizing a combined model for simulation according to an exemplary embodiment of the present invention.

FIG. 5 is a flow chart illustrating a method for generating and utilizing a combined model for simulation according to an exemplary embodiment of the present invention. According to an embodiment of the present invention, the procedures illustrated in FIG. 5 may be used in part to perform procedure 305 illustrated in FIG. 3.

At 501, the model for the channel under analysis is combined with one or more models of aggressor channels that describe one or more characteristics of crosstalk. According to an embodiment of the present invention, exemplary characteristics of crosstalk include crosstalk magnitude and crosstalk phase. This may be performed in the frequency domain. According to an embodiment of the present invention, a vector sum is computed at each frequency. According to an alternate embodiment of the present invention, a power sum is computed at each frequency and causality is enforced. Both the vector sum and the power sum represent the magnitude and the phase components of crosstalk simultaneously in a single value. Consider the following exemplary representation of crosstalk.

$$V_{n1}(f)=A_{n1}(f) \cdot e^{i \cdot \theta_{n1}(f)}, V_{n2}(f)=A_{n2}(f) \cdot e^{i \cdot \theta_{n2}(f)}, V_{n3}(f)=A_{n3}(f) \cdot e^{i \cdot \theta_{n2}(f)}, \ldots$$

The vector sum of the crosstalk may be represented with the following.

$$V_{sum}(f)=[A_{n1}(f)\cos\theta_{n1}(f)+A_{n2}(f)\cos\theta_{n2}(f)+A_{n3}(f)\cos\theta_{n3}(f)+\ldots]+i[A_{n1}(f)\sin\theta_{n1}(f)+A_{n2}(f)\sin\theta_{n2}(f)+A_{n3}(f)\sin\theta_{n3}(f)+\ldots]$$

The power sum of crosstalk may be represented with the following.

$$\text{PowerSum}_{magnitude}(f)=\sqrt{A_{n1}^{2}(f)+A_{n2}^{2}(f)+A_{n3}^{2}(f)+\ldots}$$

At 502, an amount of skew is added between a signal on the victim channel and crosstalk characteristics from the aggressor channel. When a plurality of aggressor channels exists, a first aggressor channel may be combined with the victim channel at 501 and skew may be added at 502. Afterwards, a second aggressor channel may be combined with the combined channel and skew may be added. This procedure may be repeated until all the aggressor channels have been added to the combined channel.

At 503, it is determined whether an additional aggressor channels exists to be combined. If an additional aggressor channel exists to be combined, control returns to 501. If an additional aggressor channel does not exist to be combined, control proceeds to 504.

At 504, a simulation is performed using the combined model.

Figure 6:
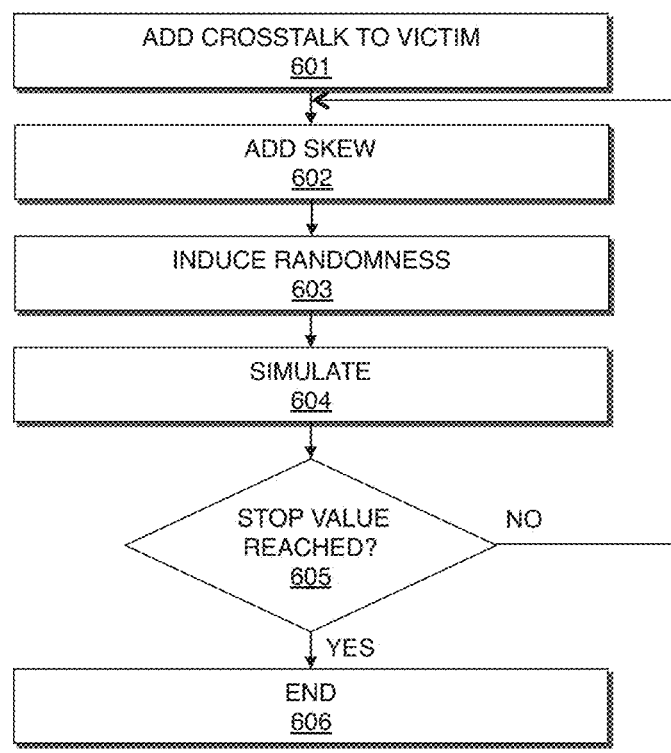
FIG. 6 is a flow chart illustrating a method for simulating a plurality of channels according to an exemplary embodiment of the present invention.

FIG. 6 is a flow chart illustrating a method for simulating a plurality of channels according to an exemplary embodiment of the present invention. According to an embodiment of the present invention, the procedures illustrated in FIG. 6 may be used in part to perform procedure 306 illustrated in FIG. 3.

At 601, crosstalk characteristics from the aggressor channel(s) are added to a signal on the channel under analysis (victim channel). According to an embodiment of the present invention, the crosstalk characteristics may include crosstalk magnitude and crosstalk skew. This may be performed in the time domain, According to an embodiment of the present invention, the crosstalk may be added using a waveform base simulation method or a statistical simulation method.

At 602, an amount of skew is added between the signal on the victim channel and the crosstalk characteristics from the aggressor channel. According to an embodiment of the present invention, a user specifies a starting value for the skew which is added on a first iteration of the flow (starting skew), a skew value which is added at each iteration (step skew), and a maximum value for the skew (stop value).

At 603, randomness is induced in bit patterns used to represent the signal on the victim channel and the crosstalk characteristics from the aggressor channel. It should be appreciated that this procedure is optional and used when a simulator uses a same bit pattern for both the signal on the victim channel and the crosstalk characteristics.

At 604, a simulation is performed using the model for the victim channel and the model(s) for the aggressor channel(s).

At 605, it is determined whether a maximum value for the skew has been reached. If the maximum value of the skew has been reached control proceeds to 606. If the maximum value for the skew has not been reached, control returns to 602.

At 606, control terminates the procedure.

Figure 7:
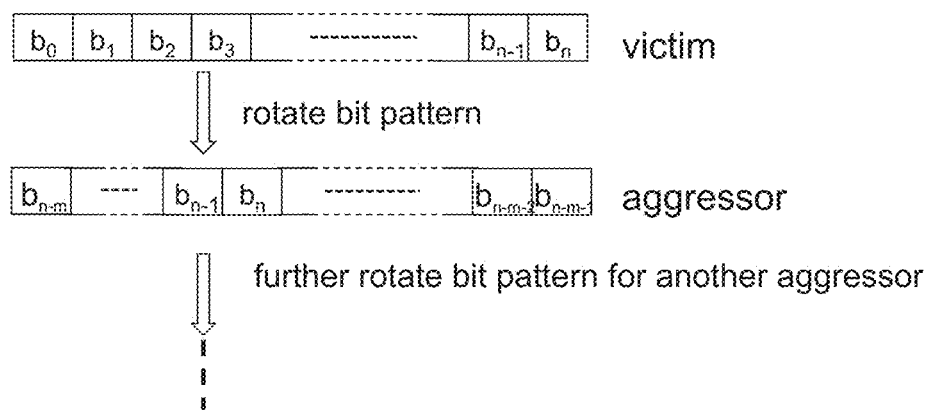
FIG. 7 illustrates an example of bit pattern rotation according to an exemplary embodiment of the present invention.

FIG. 7 illustrates an example of bit pattern rotation according to an exemplary embodiment of the present invention. According to an embodiment of the present invention, the procedures in FIG. 7 that perform bit pattern rotation may be performed at 603 from FIG. 6 to introduce randomness in bit patterns. When a bit pattern is random or pseudo-random, a small bit shift is sufficient to introduce randomness between it and a duplicate bit pattern. As illustrated in FIG. 7, when the bit pattern for the signal on the victim channel and the crosstalk characteristic on the aggressor channel are identical, the bit pattern for the aggressor may be rotated. When a plurality of aggressor channels exist, further shifting of the bit pattern may be performed. This procedure may be repeated for each additional aggressor channel.

FIGS. 1, 3, 5, 6 and 7 are flow charts and diagrams that illustrate embodiments of the present invention. Some of the techniques illustrated may be performed sequentially, in parallel or in an order other than that which is described and that the procedures described may be repeated. It should be appreciated that not all of the techniques described are required to be performed, that additional techniques may be added, and that some of the illustrated techniques may be substituted with other techniques.

Figure 8:
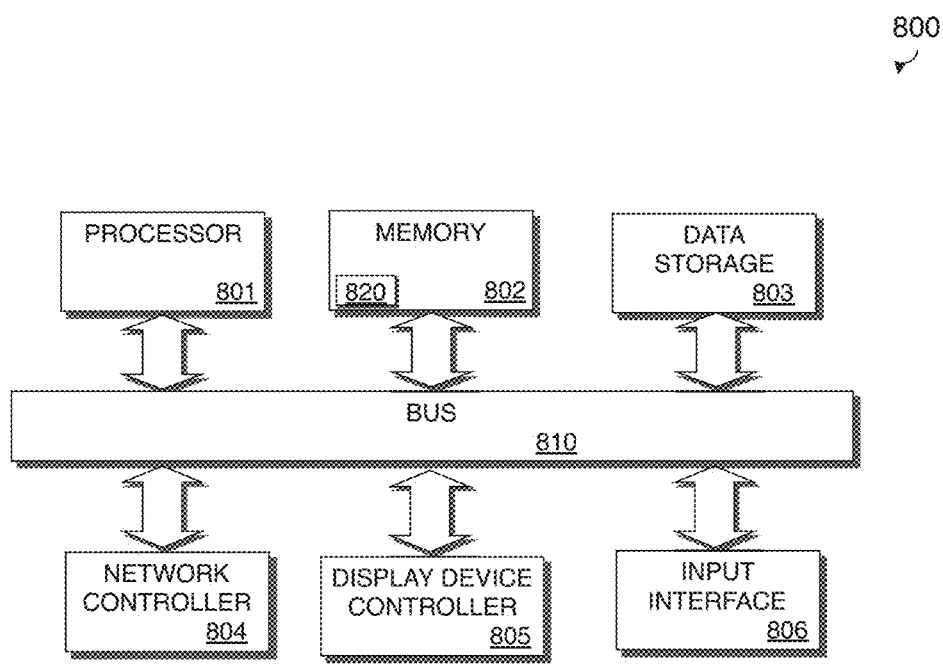
FIG. 8 illustrates a block diagram of a computer system implementing a system designer according to an embodiment of the present invention.

FIG. 8 is a block diagram of an exemplary computer system 800 in which an example embodiment of the present invention resides. The computer system 800 may be used to implement a system designer such as an EDA tool. The computer system 800 includes a processor 801 that processes data signals. The processor 801 is coupled to a bus 810 that transmits data signals between components in the computer system 800. The bus 810 may be a single bus or a combination of multiple buses. The computer system 800 includes a memory 802. The memory 802 may be a dynamic random access memory device, a static random access memory device, and/or other memory device. The memory 802 may store instructions and code represented by data signals that may be executed by the processor 801. A data storage device 803 is coupled to the bus 810. The data storage device 803 may be a hard disk drive, a floppy disk drive, a CD-ROM device, a flash memory device or other mass storage device.

A network controller 804 is coupled to the bus 810. The network controller 804 may link the computer system 800 to a network of computers (not shown) and supports communication among the machines. A display device controller 805 is coupled to the bus 810. The display device controller 805 allows coupling of a display device (not shown) to the computer system 800 and acts as an interface between the display device and the computer system 800. An input interface 806 is coupled to the bus 810. The input interface 806 may be, for example, a keyboard and/or mouse controller or other input interface. The input interface 806 allows coupling of an input device to the computer system 800 and transmits data signals from an input device to the computer system 800. It should be appreciated that computer systems having a different architecture or having different components may also be used to implement the computer system 800.

Figure 9:
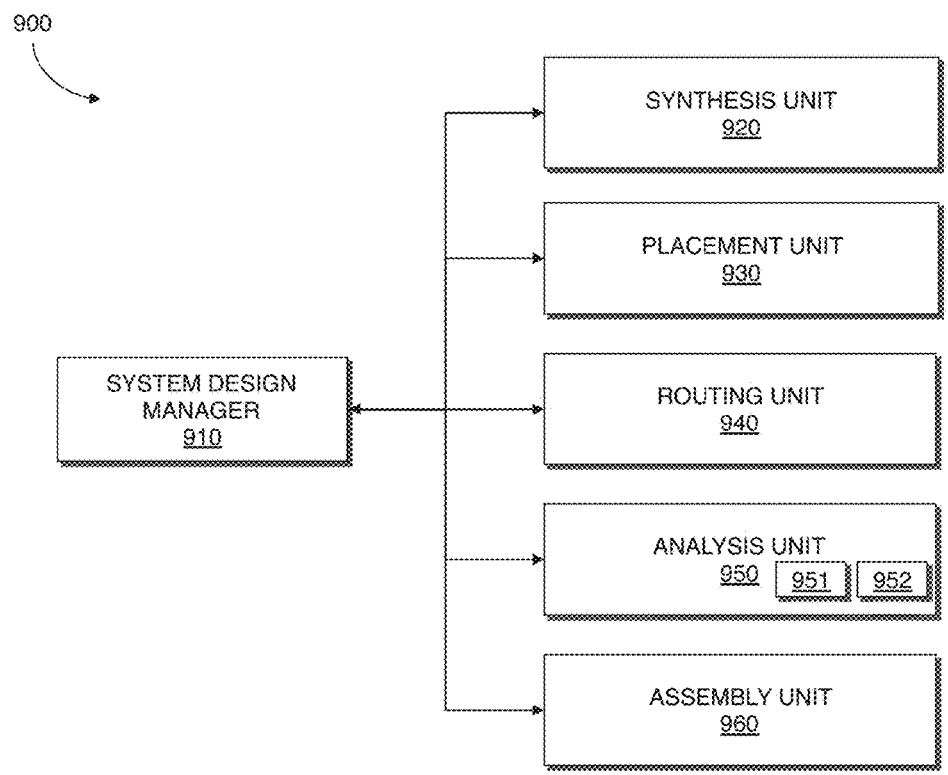
FIG. 9 illustrates a block diagram of a system designer according to an embodiment of the present invention.

According to an embodiment of the present invention, a system designer 820 may reside in memory 802 and be executed by the processor 801. The system designer 820 may operate to generate a system design, process simulation data from the system design, and simulate the effects of crosstalk on channels of the system design from the simulation data. According to an embodiment of the present invention, a simulation data processing unit in the system designer 820 determines whether a model is available for a channel. In response to determining that the model is unavailable, a model is generated for the channel using signal attenuation parameters provided by a user. The model is generated to also include crosstalk characteristics from crosstalk parameters provided by the user. According to a second embodiment of the present invention, a first model for a first channel is combined with a second model for second channel having crosstalk into a single combined model. The single combined model is simulated FIG. 9 illustrates a system designer 900 according to an embodiment of the present invention. The system designer 900 may be an EDA tool for designing a system on a target device such as an FPGA, structured application-specific integrated circuit (ASIC), ASIC, or other circuitry. FIG. 9 illustrates modules implementing an embodiment of the system designer 900. According to one embodiment, the modules represent software modules and system design may be performed by a computer system such as the one illustrated in FIG. 8 executing sequences of instructions represented by the modules shown in FIG. 9. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 900 includes a system designer manager 910. The designer system manager 910 is connected to and transmits data between the other components of the system designer 900. The system designer manager 910 provides an interface that allows a user to input data into the system designer 900. According to an embodiment of the present invention, a description of a system may be input into the system designer by the user. The description of the system may be in HDL format provided by the user or by another tool.

The system designer 900 includes a synthesis unit 920. The synthesis unit 920 generates a logic design of the system to be implemented by the target device. According to an embodiment of the present invention, the synthesis unit 920 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer includes a placement unit 930. According to an embodiment of the present invention, the placement unit 930 places the mapped logical system design on the target device. Placement works on the technology-mapped netlist to produce a placement for each of the functional blocks. According to an embodiment of the present invention, placement unit 930 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 900 includes a routing unit 940 which routes the placed design on the target device. The routing unit 940 allocates routing resources on the target device to provide interconnections between logic gates, logic elements, and other components on the target device. The routing unit 940 may also perform routability optimization on the placed logic design.

The system designer 900 includes an analysis unit 950. The analysis unit 950 may operate to perform timing analysis of signals routed on routing paths which may also be referred to as links or channels. The timing analysis unit may also perform a simulation of aspects of the system design to determine the effect of crosstalk on signals transmitted on the channels in the system. According to an embodiment of the system designer 900, the analysis unit includes a simulation data processing unit 951 that operates to generate models of victim channels and aggressor channels, and a simulator unit 952 that operates to perform simulations utilizing the models. It should be appreciated that the synthesis unit 920, placement unit 930, and routing unit 940 may modify the system design in response to results received from the analysis unit 950.

The system designer 900 includes an assembly unit 960 that performs an assembly procedure that creates a data file that includes the design of the system generated by the system designer 900. The data file may be a bit stream that may be used to program the target device. The assembly unit 960 may output the data file so that the data file may be stored or alternatively transmitted to a separate machine used to program the target device. It should be appreciated that the assembly unit 960 may also output the design of the system in other forms such as on a display device or other medium.

Figure 10:
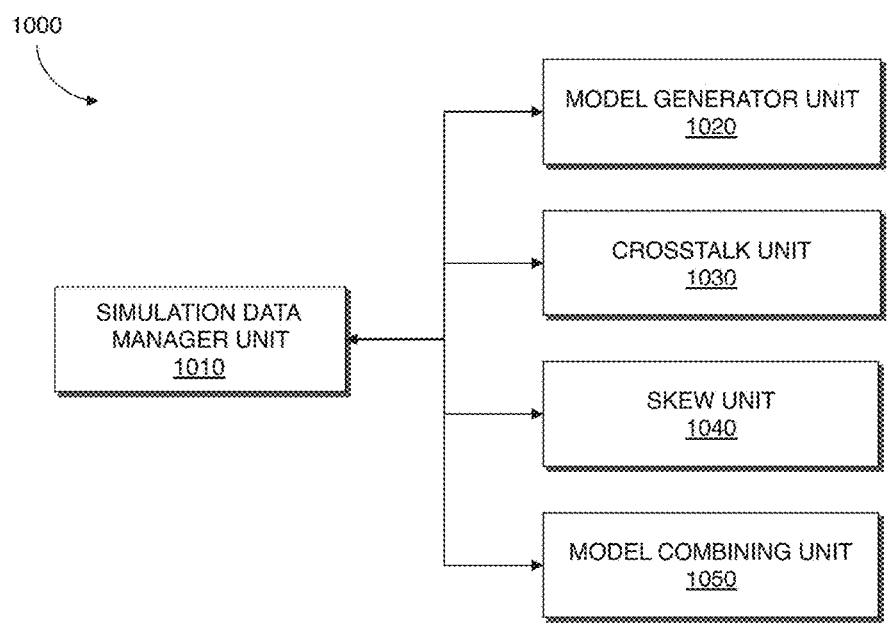
FIG. 10 illustrates a block diagram of a simulation data processor unit according to an embodiment of the present invention.

FIG. 10 illustrates a block diagram of a simulation data processor unit 1000 according to an embodiment of the present invention. The simulation data processor unit 1000 may be used to implement the simulation data processor unit 951 illustrated in FIG. 9.

The simulation data processor unit 1000 includes a simulation data manager unit 1010. The simulation data manager unit 1010 is connected to and transmits data between the other components of the simulation data processor unit 1000.

The simulation data processor unit 1000 includes a model generator unit 1020. The model generator unit 1020 generates a model for a channel using signal attenuation parameters provided by a user to describe characteristics of the channel. The signal attenuation parameters may include parameters associated with direct current, Skin effect, dielectric loss, and/or other parameters. According to an embodiment of the present invention, the model describes characteristics of the channel and may be in the format of an impulse response, scattering parameters (S-parameters), or other format.

The simulation data processor unit 1000 includes a crosstalk unit 1030. The crosstalk unit 1030 adds crosstalk (noise) characteristics the model of the channel under analysis using crosstalk parameters provided by the user. According to an embodiment of the present invention where crosstalk is added in the frequency domain, the crosstalk parameters are associated with insertion loss deviation to the channel under analysis. The crosstalk parameters may be provided by the user by designing a crosstalk frequency profile. According to an embodiment of the present invention where crosstalk is added in the time domain, crosstalk is added to the model of the channel under analysis using bounded uncorrelated noise. The bounded uncorrelated noise may be added using one or more different methods including a uniform, truncated Gaussian, dual-Dirac, or probability density function.

The simulation data processor unit 1000 includes a skew unit 1040. The skew unit 1040 is operable to add skew between a signal transmitted on the channel under analysis and the crosstalk characteristics. The amount of skew added may be determined by a user. The skew unit 1040 may be used to perform a skew sweep that modifies existing programmed skew in order to further investigate the effects of crosstalk. According to an embodiment of the present invention, a skew sweep may be performed by performing a linear sweep with a start, step, and stop values. Alternatively, the skew sweep may be performed by first finding a gross phase skew for a target scenario using a single bit response. Afterwards, a finer skew is used to find an optimum skew around the initial gross skew value.

The simulation data processor unit 1000 includes a model combining unit 1050. The model combining unit 1050 is operable to generated a combined model which includes the model for the channel under analysis and one or more aggressor channels that describe the characteristics of the crosstalk. The model combining unit 1050 may also perform some of the procedures described with reference to FIG. 5. The combined model may be used by a simulator to simulate the effects of crosstalk on signals on the victim channel.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Embodiments of the present invention allow for pre-silicon simulation, post-silicon simulation measurement correlation, system debugging, and evaluation for link architecture design. Embodiments of the present invention facilitate crosstalk simulation using only a victim channel file in which crosstalk information is embedded. This allows crosstalk simulation to be performed with older simulators that may not support crosstalk simulation. When insufficient information is available about crosstalk, embodiments of the present invention allow a user to investigate the impact of crosstalk on the performance of a target link by allowing the user to specify characteristics of the crosstalk. Embodiments of the invention also allow the user to investigate a range of relationships between a victim channel and crosstalk channels, between worst case and least problematic case scenarios.

Figure 11:
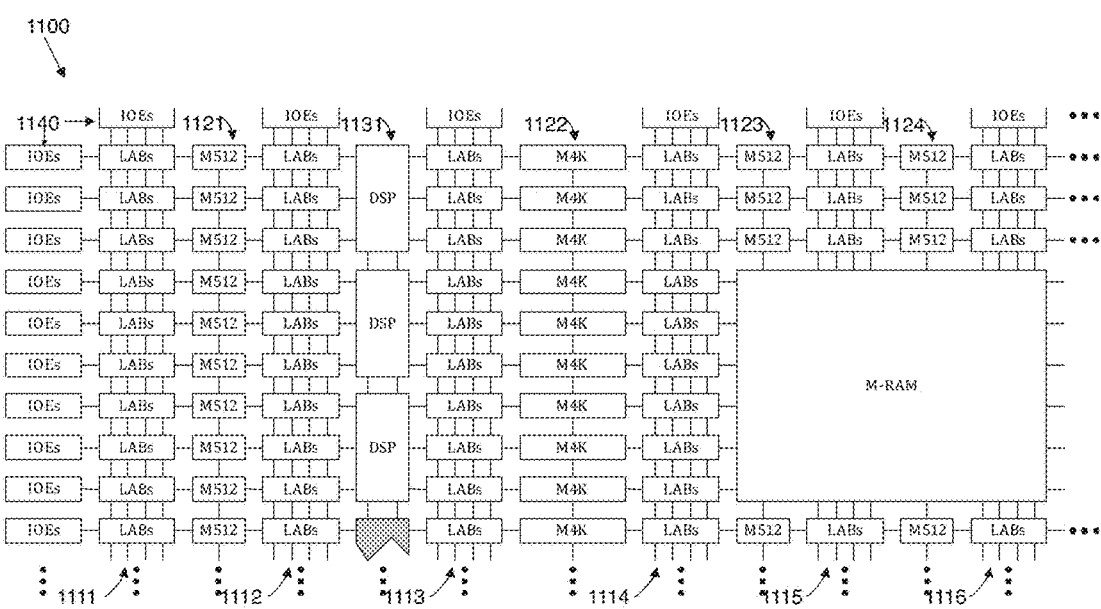
FIG. 11 illustrates an exemplary target device according to an embodiment of the present invention.

FIG. 11 illustrates a device 1100 that may be used to implement a target device according to an embodiment of the present invention. The device 1100 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1100. Columns of LABs are shown as 1111-1116. It should be appreciated that the logic block may include additional or alternate components.

The device 1100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1100. Columns of memory blocks are shown as 1121-1124.

The device 1100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1100 and are shown as 1131.

The device 1100 includes a plurality of input/output elements (IOEs) 1140. Each IOE feeds an IO pin (not shown) on the device 1100. The IOEs 1140 are located at the end of LAB rows and columns around the periphery of the device 1100. Each IOE may include a bidirectional IO buffer and a plurality of registers for registering input, output, and output-enable signals.

The device 1100 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
   determining whether a model is available for a channel; and
   in response to determining that the model is unavailable, generating the model for the channel using signal attenuation parameters provided by a user, wherein the model includes crosstalk characteristics from crosstalk parameters provided by the user;
   generating a design for the system utilizing information from the model;
   generating a data file that describes the design for the system; and
   programming the target device with the data file to physically transform components on the target device to implement the system.

2. The method of claim 1, wherein the signal attenuation parameters provided by the user is associated with direct current, Skin effect, and dielectric loss.

3. The method of claim 1, wherein the cross talk parameters provided by the user is associated with insertion loss deviation.

4. The method of claim 1, wherein the model comprises scattering parameters.

5. The method of claim 1, wherein the channel comprises media for transmitting communication.

6. The method of claim 1 further comprising adding skew between the channel and the crosstalk characteristics.

7. The method of claim 1 further comprising simulating operation of the channel using the model.

8. The method of claim 7 further comprising:
modifying skew between the channel and the crosstalk characteristic in the model; and
simulating operation of the channel using the modified model.

9. The method of claim 1, wherein generating the model for the channel further comprises using phase delay parameters.

10. A non-transitory computer readable medium including a sequence of instructions stored thereon for causing a computer to execute a method comprising:
combining a first model for a first channel with a second model for a second channel having crosstalk into a single combined model;
simulating the single combined model;
generating a design for a system utilizing information from the single combined model;
generating a data file that describes the design for the system; and
programming a target device with the data file to physically transform components on the target device to implement the system.

11. The non-transitory computer readable medium of claim 10, wherein the method further comprises adding skew between the first channel and the second channel.

12. The non-transitory computer readable medium of claim 10, wherein the method further comprises:
modifying skew between the first channel and the second channel in the model; and
simulating operation of the first channel and the second channel using the modified model.

13. The non-transitory computer readable medium of claim 10, wherein the model is in a format of scattering parameters.

14. The non-transitory computer readable medium of claim 10, wherein the first channel and the second channel comprise media for transmitting communication.

15. The non-transitory computer readable medium of claim 10, wherein the method further comprises generating the first model using signal attenuation parameters provided by a user.

16. The non-transitory computer readable medium of claim 15, wherein the signal attenuation parameters is associated with direct current, Skin effect, and dielectric loss.

17. The non-transitory computer readable medium of claim 10, wherein the method further comprises generating the second model using crosstalk parameters provided by a user.

18. The non-transitory computer readable medium of claim 17, wherein the crosstalk parameters is associated with insertion loss deviation.

19. A system designer for designing and implementing a system on a target device, comprising:
a simulation data processing unit that includes a model generator unit that generates a model for a channel using signal attenuation parameters provided by a user, and crosstalk unit that adds crosstalk characteristics from cross-talk parameters provided by the user;
a synthesis unit that generates a design for the system utilizing information from the model; and
an assembly unit that generates a data file that describes the design for the system, and that programs the target device with the data file to physically transform components on the target device to implement the system.

20. The system designer of claim 19, wherein the crosstalk unit is operable to inject crosstalk characteristic in the time domain and the frequency domain.

21. The system designer of claim 19 further comprising a skew unit operable to add an amount of skew between the channel and the crosstalk characteristics in response to user specification.

22. The system designer of claim 19 further comprising a model combining unit operable to combine the model for the channel with a model for another channel having crosstalk into a single combined model.

* * * * *